Oct. 1, 1935.   E. E. GREGORY   2,016,244
THERMOSTAT
Original Filed Oct. 27, 1925   2 Sheets-Sheet 1

INVENTOR
Eli E. Gregory
BY
Mason, Fenwick + Lawrence
ATTORNEYS

Oct. 1, 1935.  E. E. GREGORY  2,016,244

THERMOSTAT

Original Filed Oct. 27, 1925  2 Sheets-Sheet 2

INVENTOR
ELI E. GREGORY
BY
Mason, Fenwick + Lawrence
ATTORNEYS

Patented Oct. 1, 1935

2,016,244

UNITED STATES PATENT OFFICE 2,016,244

THERMOSTAT

Eli E. Gregory, Brooklyn, N. Y., assignor to Spencer Thermostat Company, a corporation of Massachusetts Application October 27, 1925, Serial No. 65,218
Renewed June 18, 1934

16 Claims. (Cl. 200—122)

My invention relates to thermostats one example of which is illustrated in my prior Letters Patent dated March 16, 1926, No. 1,576,649 in connection with the movable hand, index or feature of an advertising device, to reciprocate said feature abruptly or with a jump motion as the temperature of the thermostatic element changes.

My invention comprises a flexible strip, sheet, plate or piece of thermostatic material which is held flexed in one direction by a yielding or elastic pressure in such a manner that when the temperature of the thermostat rises, the greater expansion of its component material opposite said direction when sufficient will cause the thermostatic piece to overcome the elastic pressure thereon and to spring abruptly past the center of pressure to a flexure in the opposite direction, and when the temperature of the thermostat falls, the thermostatic piece will conversely spring abruptly past the center of pressure to its original position.

My invention comprises also an electric heating resistant applied to the thermostatic piece so as to cause the same to move abruptly as stated.

My invention also comprises means for adjustably limiting the abrupt movement of the thermostatic piece, so as to regulate its action.

My invention also comprises means for adjusting the elastic pressure by which the thermostatic piece is held flexed, so as to regulate its action.

I do not claim broadly the thermostat herein described in this application, as the same forms the subject of a divisional application Serial No. 88,095, filed February 13, 1926, now Patent No. 1,845,998, dated February 16, 1932.

My present invention consists primarily in the combination with this thermostat of an electric circuit controller whose contacts are so arranged with relation to the thermostatic piece as to be opened and closed abruptly by the abrupt movements of the thermostatic piece.

My invention consists also in placing the electric resistant in an electric circuit with the controller which is opened and closed by the thermostat, so that the circuit will be alternately and automatically opened and closed by the alternate heating and cooling of the thermostatic piece and consequent opening and closing of the controller and circuit.

My invention also consists of means for adjusting the electric controller contacts with relation to the thermostatic piece, so as to regulate the operation of the thermostat.

My invention consists also in combining with the thermostat, a main electric circuit and controller operated by the thermostat, an electric resistant applied to the thermostatic piece, and a shunt circuit and controller in circuit with the resistant, so that the main circuit is alternately and automatically opened and closed as the shunt circuit is alternately opened and closed and the thermostatic piece thus alternately and relatively cooled and heated.

My invention also comprises means for varying the heating effect of the resistant on the thermostatic piece, so as to regulate its action.

My invention also comprises various other features of construction and arrangement hereafter described and claimed.

In order that my invention may be fully understood I shall first describe in detail one embodiment and one practical application of the invention and then point out the invention in the claims.

Figure 1:
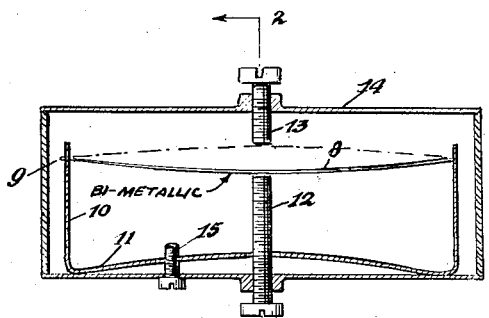
Figure 1 is a side view of a thermostat embodied in my invention.
Figure 2:
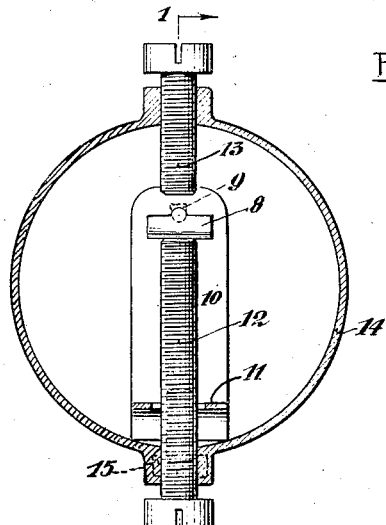
Figure 2 is a cross-sectional view of the same on the line 2—2, Figure 1.
Figure 4:
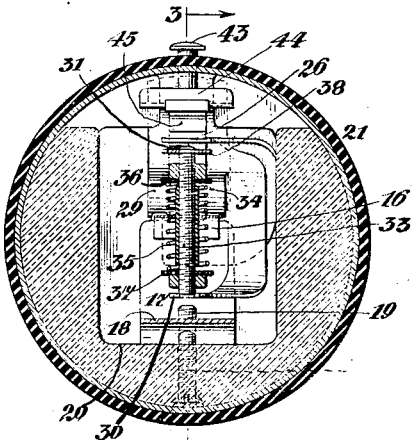
Figure 4 is a cross sectional view on the line 4—4, Figure 3.

Referring first to the bare thermostat shown in Figures 1 and 2, 8 designates a flexible piece, in this instance, a strip of flexible thermostatic material, which is held flexed under elastic pressure, in this example of my invention, by being held pivotally at its opposite ends in seats 9 in the opposite flexible arms 10 of a flexible strip 11, the more expansive component material of the thermostatic piece 8 being in this case on the side opposite the direction toward which the piece is flexed when the thermostatic piece is cooler, so that when the thermostatic piece is heated sufficiently to expand the more expansive component and overcome the elastic inward pressure of the arms 10 and their connecting strip 11, the thermostatic piece 8 will spring abruptly past the axis of pressure into the opposite position shown in dotted lines in Figure 1. Conversely, when the temperature of the thermostatic piece 8 falls sufficiently to contract the more expansive component material and overcome the yielding inward pressure of the arms 10, the thermostatic piece 8 will spring in the opposite direction past the axis of pressure to the position shown in full lines in Figure 1.

In my prior Letters Patent No. 1,576,649 before referred to I have illustrated the application of this jump thermostat to throw abruptly the hand or feature of an advertising device alternately in opposite directions and through a novel light spring vibrator interposed between the feature and its actuating shaft or device to cause the feature to continue its oscillations in each of its two primary positions.

This novel jump thermostat is also applicable as a motor wherever such an abrupt motion is desired.

To regulate the action of the thermostatic piece 8, and limit its jump in either direction, I have shown in Figures 1 and 2, stops 12 and 13 mounted adjustably in a case or other fixture 14 on opposite sides of the piece 8, so that by, in this instance, screwing the stops 12 and 13 in the fixture 14, the movement of the piece 8 can be stopped at any desired point.

Further to adjust, regulate and control the action of the thermostatic piece 8, when as in the present instance it is held flexed under yielding pressure by the arms 10 of the flexible connecting strip 11, I have illustrated an adjusting screw 15, working in the fixture 14, and threaded to the flexible connecting piece 11, so that by turning the screw 15, the flexible connecting piece 11 can be flexed more or less to increase or decrease the yielding axial pressure of the arms 10 on the flexible piece 8, and thus flex the piece 8 more or less and regulate its action as desired.

In Figures 3, 4, 5, 6, and 7, I have illustrated my novel jump thermostat applied to a thermostatic control for an electric iron or any other electric device where it is important that the electric switch should be closed and opened abruptly so as to prevent arcing, or where the energizing current should be automatically cut off or diminished when the device becomes too hot or the current should be interrupted or reduced for any other reason.

In said Figures 3, 4, 5, 6, and 7 the member 16 designates the flexible thermostatic piece, 17 the elastic arms holding the thermostatic strip under yielding pressure, 18 the flexible connecting strip, 19 the pressure adjusting screw and 20 the supporting fixture as previously described.

I have shown the fixture 20 as a double connecting plug 21 to be interposed between and inserted in the sockets of an electric circuit and an electric iron for example, the plug 22 on one end having the usual contact 23, and the plug 24 on the other end having the usual contact 25.

The contacts 23 and 25 are electrically connected with the respective elastic contacts 26 and 27 of the main or heating circuit of the electric iron and the contact 25 is also electrically connected with one elastic contact 28 of a shunt circuit and the conducting plug 22 is electrically connected with two separate elastic contacts 29 and 30 of the shunt circuit, the shunt circuit instead of the main circuit being, in this example, used to heat the thermostatic piece 16 and thus effect its action. Of course the mere heat of the iron or other heating device itself might be used to effect the action of the thermostat, without the need of a separate thermostat heater as illustrated, but the control shown by a shunt circuit or by the main circuit is applicable to control an electric lamp or any other electric device, which may be remote from the thermostat or control.

The main contacts 26 and 27 are arranged to be simultaneously engaged and electrically connected to close the main circuit, by the respective contacts 31 and 32 of a contact bar 38 carried by a stud 33 passed transversely and loosely through the middle of the thermostatic piece 16, and held yieldingly therein by coiled springs 34 and 35, bearing on opposite sides of the piece 16 and confined by the collars 36 and 37 respectively, which are threaded to the stud 33, for adjusting the pressure of said springs.

By this construction the yielding contact bar 38 can be adjusted so that it will not break the main circuit until the thermostatic piece 16 is strained to the point where it will jump abruptly to its opening position, and thus arcing and chattering will be avoided. It is evident that without the yielding contact bar 38, the yielding contacts 26 and 27 themselves can be arranged to follow up the opening movement of the thermostatic piece 16 to its jumping point, and then only break contact, to the same end.

The yielding shunt contacts 28, 29, and 30 are in this instance arranged to engage with contacts 39, 40 and 41 respectively fixed on the thermostatic piece 16 and in circuit with an insulated resistant heating wire 42 coiled around the thermostatic piece 16 and an insulated push button 43 is mounted movably on the outside of the double plug 21 to engage a cam projection 44 on a yielding arm 45 carrying the contacts 29 and 30.

Figure 3:
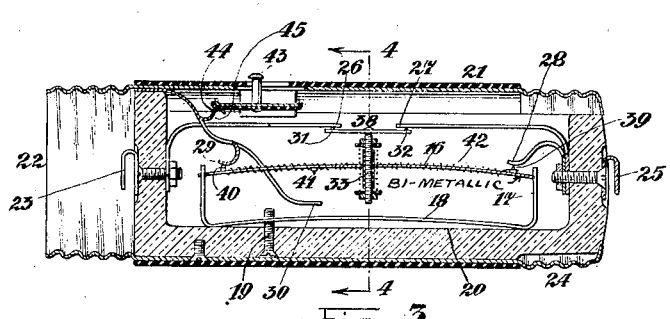
Figure 3 is a sectional side view of an automatic thermostatic control embodying my invention for an electric iron, lamp or any other electric device, showing the heating or main circuit closed.
Figure 5:
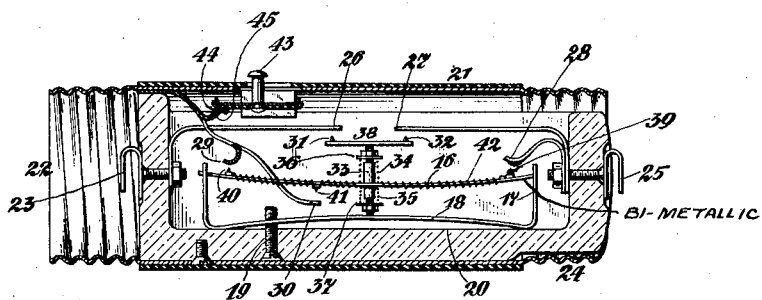
Figure 5 is a sectional side view of the said control showing the main circuit opened.

With this arrangement, when the push button is in the starting position shown in Figure 3, the thermostat cool, and the main circuit through the contacts 23, 26, 31, 32, 27, and 25 closed, a shunt current will pass through the plug 22, contacts 29, 40, resistant 42 and contacts 39, 28 and 25, and will heat the thermostat slowly.

As the heat, in the case for example of an electric iron reaches a predetermined maximum, or, in the case of a lamp for example, the current reaches a predetermined maximum, the thermostatic piece will jump as described, abruptly breaking the main circuit and also the shunt circuit, the contacts 29, 40, and 39, 28, being abruptly separated. Conversely as the heat or current diminishes too greatly, the thermostat will automatically and abruptly reestablish both the main heating and shunt thermostat heating circuits.

Figure 6:
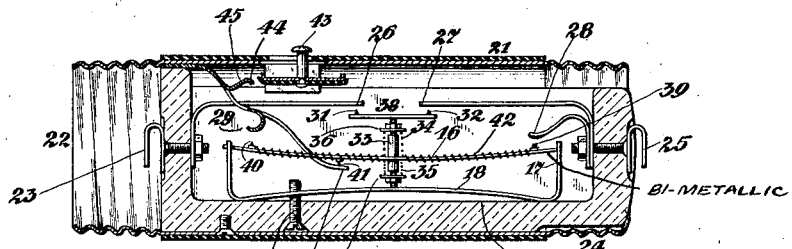
Figure 6 is a sectional side view of the said control, showing the heating element adjusted for more temperate action.
Figure 7:
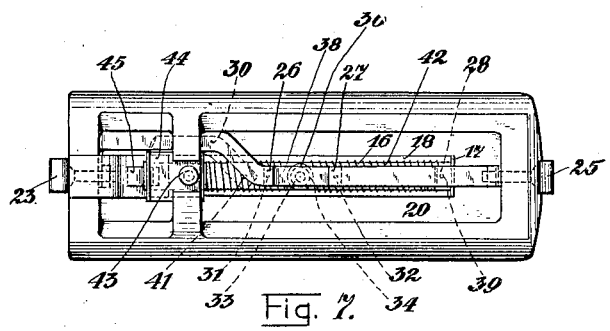
Figure 7 is a plan view of the control with its outside shell removed.

To accelerate this on and off action of the thermostat, the push button 43 is moved to the position shown in Figure 6, releasing the spring arm 45, separating the contacts 29 and 40, and causing the contact 30 to spring into and remain in engagement with the contact 41, of the resistant between the other resistant contacts 40 and 39. Then a shorter line of resistant will be in the shunt circuit, and a correspondingly greater heating and faster action of the thermostat will be produced.

The purpose of this shorter resistant will be understood from the following. If a lesser degree of heat is required, for example, in the case of an electric iron, if a cooler iron is required for ironing a delicate piece of material, the operator is only required to move the push button 43 to the position shown in Figure 6 when the required lesser degree of heat is reached, and the faster action of the thermostat will keep the iron at the desired temperature.

It is evident that my improved jump thermostat may be constructed in innumerable other ways, and when applied automatically to control an electric circuit as herein illustrated, the heating of the thermostat and the arrangement and adjustment of the electric circuits and controllers may be performed in numberless other ways without departing from the boundaries of my invention as defined by the following claims.

I claim as my invention:

1. A thermostatic circuit controller comprising a piece of thermostatic material, a fixed electric contact, a movable electric contact mounted movably on the thermostatic piece and opposing springs pressing said movable contact in opposite directions from the thermostatic piece.

2. A thermostatic circuit controller comprising a flexible piece of thermostatic material, elastic pressure means to hold the thermostatic piece flexed and permit it to flex oppositely across the axis of pressure, a fixed electric contact, and a movable electric contact mounted movably on the elastic thermostatic piece and a spring thereon to hold said movable contact in touch with the fixed contact until the thermostatic piece flexes across the axis of pressure.

3. In a thermostatic circuit controller, the combination of a flexible piece of thermostatic material and means pressing oppositely on said thermostatic piece, one of said opposing means being eleastic, acting to flex the thermostatic piece and to yield and cause it to jump to its oppositely flexed position when a change of temperature causes it to move across the axis of pressure, a circuit contact member movably connected to the flexing thermostatic piece, and means controlling relative movement between the contact member and the thermostatic piece to permit a partial flexing of the thermostatic piece independently of movement of the contact member.

4. In a thermostatic circuit controller, the combination of a flexible piece of thermostatic material, a yielding pressure means operable oppositely and elastically on said piece to prevent it from remaining in a straightened condition while permitting a change of temperature to flex the piece across the axis of pressure, circuit contact means movably mounted on the flexible piece, and means to prevent the contact means from accompanying movement of the flexible piece during a portion of a flexing movement of the flexible piece.

5. In a thermostatic circuit controller, the combination of a flexible piece of thermostatic material, a yielding pressure means operable oppositely and elastically on said piece to prevent it from remaining in a straightened condition while permitting a change of temperature to flex the piece across the axis of pressure, circuit contact means movably mounted on the flexible piece, and adjustable pressure means to prevent the contact means from accompanying movement of the flexible piece during a portion of a flexing movement of the flexible piece.

6. In a thermostatic circuit controller, the combination of a jump-acting thermostatic strip, a circuit contact movably mounted thereon, and adjustable pressure means to prevent the contact from accompanying the strip during a portion of the movement of the strip.

7. In a thermostatic circuit controller, the combination of a jump-acting thermostatic strip, a circuit contact member movably mounted thereon, and means to control relative movement between the strip and the contact member.

8. In a thermostatic circuit controller for maintaining the heat of an electric heating device between definite temperature limits, the combination of a jump-acting thermostatic strip adapted to operate between definite temperature limits, means to heat the strip contemporaneously with the heating of the heating device, and means to change the temperature limits of the heating device by changing the rate of heating of the strip.

9. In a thermostatic circuit controller, the combination of a jump-acting thermostatic strip, a pair of circuit contacts above said strip, a bridging member to close said circuit contacts, operating means connecting said member and the strip and permitting relative movement therebetween, said means including a spring mounting to control said relative movement, and means for adjusting the spring.

10. In a thermostatic circuit controller, the combination of a jump-acting thermostatic strip, a pair of circuit contacts above said strip, a bridging member to close said circuit contacts, operating means connecting said member and the strip and permitting relative movement therebetween, said means including a spring mounting for anti-creepage, means for adjusting the spring, and adjustable means to control the limits of movement of the strip.

11. In a thermostatic circuit controller, the combination of a jump-acting thermostat, a circuit contact movably mounted thereon, and adjustable pressure means to prevent the contact from accompanying the thermostat during a portion of the movement of the thermostat.

12. In a thermostatic circuit controller, the combination of a jump-acting thermostat, a circuit contact member movably mounted thereon, and means to control relative movement between the thermostat and the contact member.

13. An electric fixture comprising a tubular member, a plug at one end of said member, and a socket at the opposite end of said member, said plug and socket each comprising two electrical terminals, means connecting the two plug terminals to the two socket terminals, and a jump-acting thermostatic switch connected in series in one of said connecting means, said thermostatic switch being entirely housed within said tubular member.

14. An electric circuit controller for limiting the amount of current passing through an electrical circuit comprising a thermostatic device, an electric switch controlled as to position by said thermostatic device, and an electrical heating resistance shunted across said switch and positioned to apply its heat to said thermostatic device, said resistance heating, when the current exceeds a predetermined value, to an extent necessary to operate said thermostatic device to open said switch, and additional switching means in series with said electrical heating resistance and controlled as to position by said thermostatic device, whereby operation of said thermostatic device to open said main switch also breaks the circuit to said resistance.

15. An electric circuit controller for limiting the amount of current passing through an electric circuit comprising a jump-acting composite thermostatic element, an electric switch controlled as to position by said thermostatic element, and an electrical heating resistance comprising a coil surrounding said thermostatic element and shunted across said switch, said resistance heating, when the current exceeds a predetermined value, to an extent necessary to operate said thermostatic device to open said switch.

16. An electric fixture comprising a body member, connecting means at each end of said member, said connecting means each comprising at least two electrical terminals, means connecting the two terminals at one end of said body to the two terminals at the other end of said body, and a jump-acting thermostatic switch connected in series in one of said connecting means.

ELI E. GREGORY.